United States Patent [19]
Downing et al.

[11] 3,753,117

[45] Aug. 14, 1973

[54] SEVERE WEATHER WARNING DEVICE

[75] Inventors: George C. Downing; Thomas V. McEwen, both of Vicksburg, Miss.

[73] Assignee: Weather Watch Corporation, Vicksburg, Miss.

[22] Filed: Oct. 27, 1971

[21] Appl. No.: 192,863

[52] U.S. Cl.............. 325/364, 73/170 R, 325/363, 324/72, 340/248 A, 340/248 P
[51] Int. Cl. .......................................... H04b 1/06
[58] Field of Search.................. 73/170 R; 317/262; 325/67, 363, 364; 340/224, 248 A, 248 P, 253 P; 324/72

[56] References Cited
UNITED STATES PATENTS

| | | | |
|---|---|---|---|
| 3,465,245 | 9/1969 | Fischer et al. .................... | 324/72 |
| 3,121,841 | 2/1964 | Craig et al. ...................... | 325/364 |
| 3,515,992 | 6/1970 | Marbury et al. .................. | 325/364 |

*Primary Examiner*—Albert J. Mayer
*Attorney*—John W. Malley et al.

[57] ABSTRACT

An apparatus for providing a severe weather warning particularly for providing warning of an imminent tornado, whereby a preferably nonmovable antenna receives electrical signals which result from the electrical activity which accompanies a storm. The signals thus received are amplified, limited in amplitude and integrated to derive a signal which, by its amplitude level, indicates the severity of storm activity. This integrated output signal is preferably applied to a level detector to provide an alarm signal when the integrated output level reaches a pre-determined level and further two meters are preferably connected to the output of the amplifier limiter circuit and the integrating circuit, respectively, for providing both an indication of storm activity and an indication of the severity of that activity. The output of the level detector circuit is preferably connected to an audible alarm which provides an audible alarm signal when the storm severity rises to a level indicating the imminence of a tornado. A noninterruptible power supply, which shifts from A.C. current normally supplied in a house to standby batteries when an outage occurs, preferably supplies the electrical power for the unit, which is self-contained and suitable for use in individual homes and the like.

15 Claims, 5 Drawing Figures

PATENTED AUG 14 1973

INVENTORS
GEORGE C. DOWNING
THOMAS V. MCEWEN

BY Cushman, Darby & Cushman
ATTORNEYS

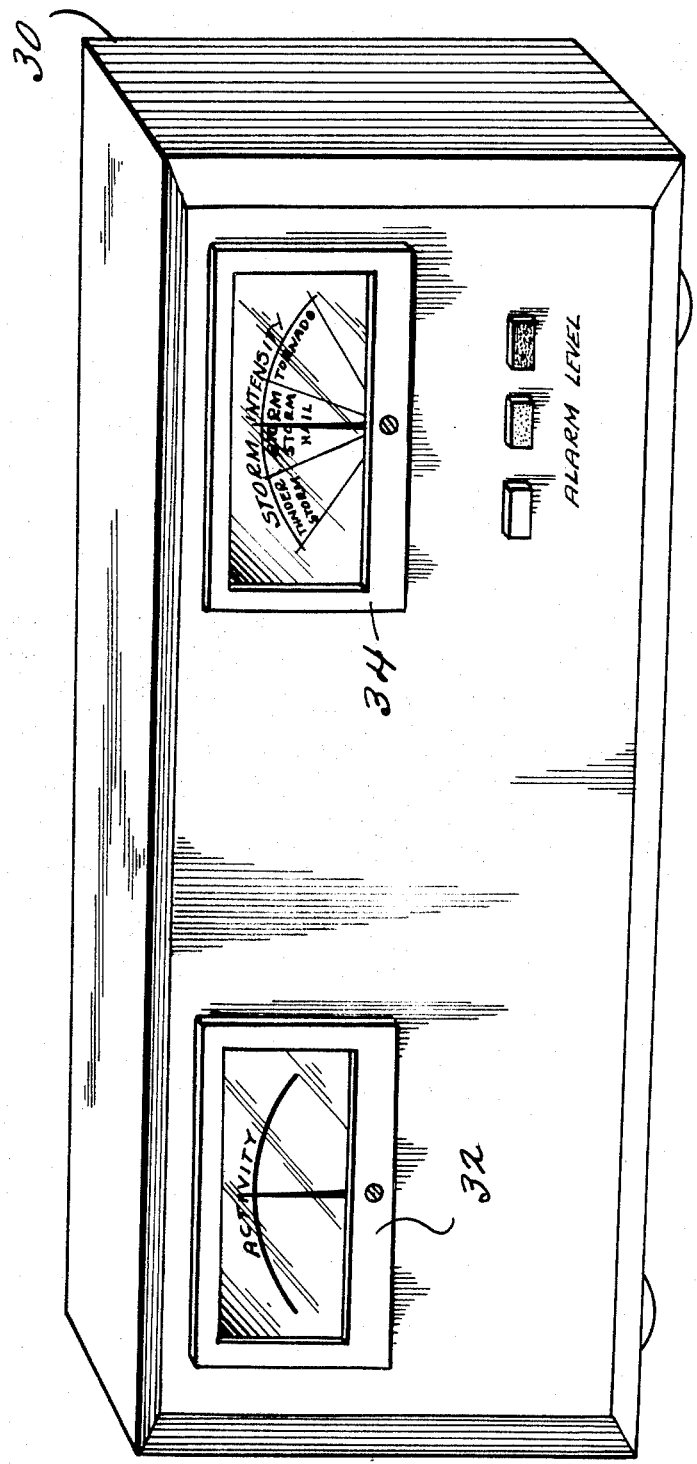

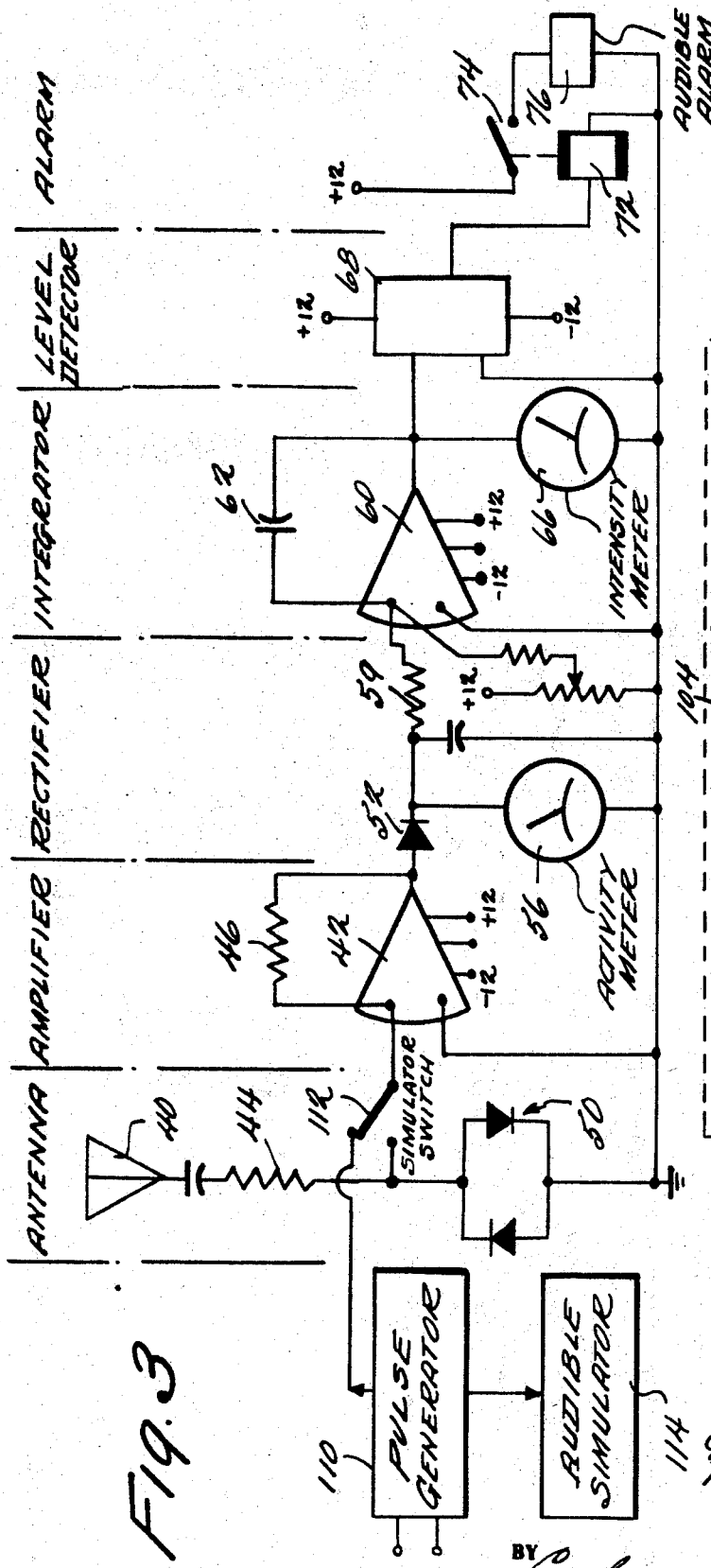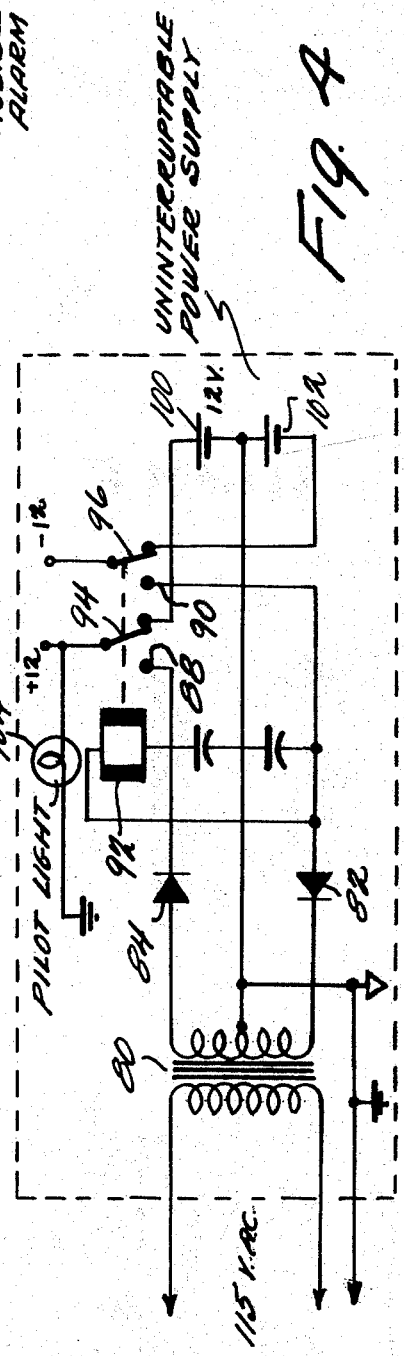

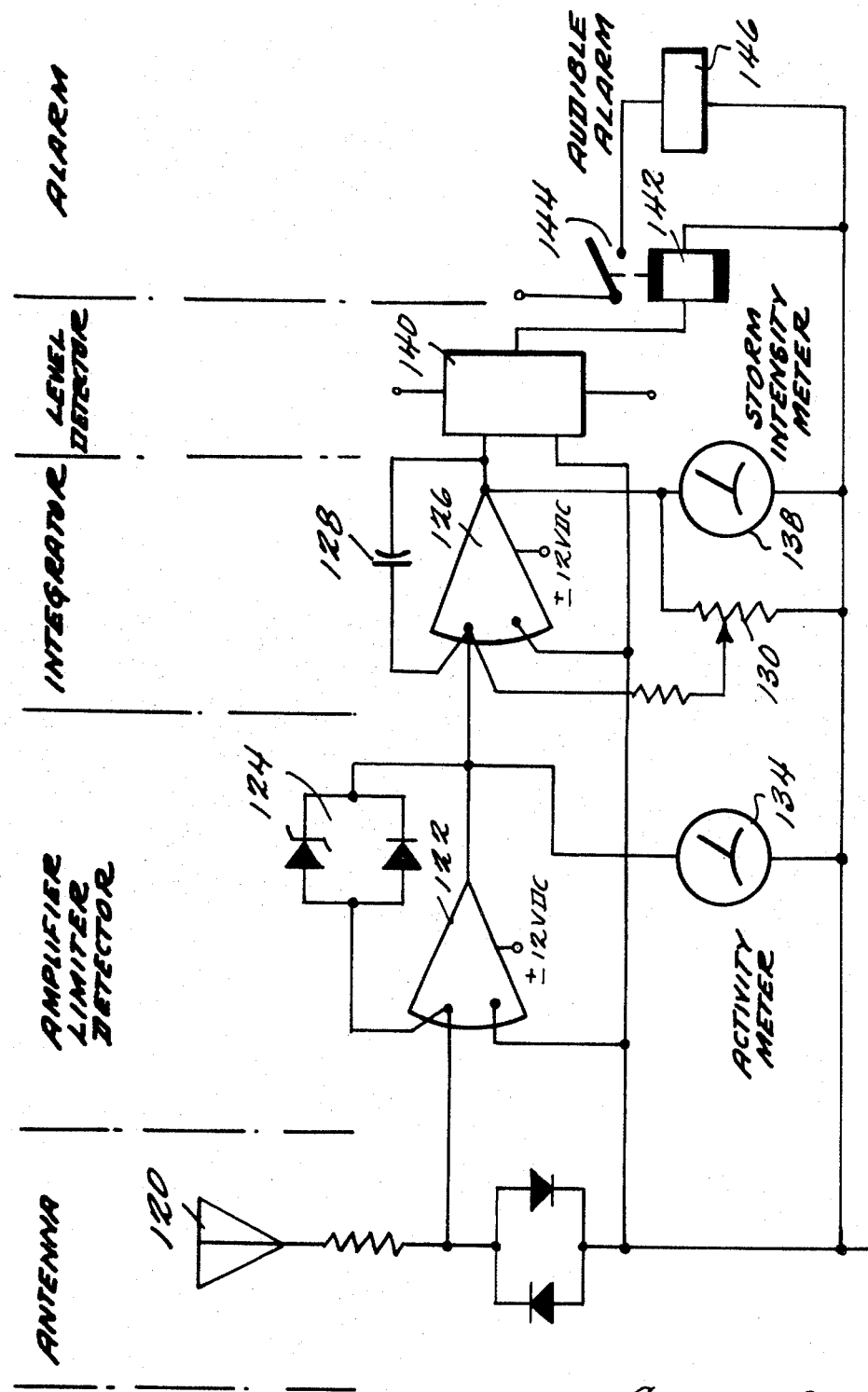

SEVERE WEATHER WARNING DEVICE

BRIEF DESCRIPTION OF THE PRIOR ART AND SUMMARY OF THE INVENTION

The invention relates to an apparatus for detecting severe storms, including tornadoes, and giving a warning thereof.

Much of the loss of life in this country and abroad which results from tornadoes and other severe storm activity, can be avoided if the individuals in danger are given a reliable warning. The Weather Bureau makes an extensive effort to provide such a warning by reporting severe weather conditions as they develop over various parts of the country. These Weather Bureau warnings, while useful, are applicable to such large areas that their impact is diffused and they are largely ignored because in actuality the chance of severe weather in an individual's own area is small. Further, while warnings can be given over television and the radio and through local sirens and the like, they still do not penetrate to a substantial portion of the population which may be asleep or otherwise oblivious to the warning. Further, the warnings thus issued do not indicate that a tornado may descend within the next few minutes, but only that there is a general danger over the next few hours or even days. Of course, it is impractical for people to remain in shelters or in a total alert condition for an extended period of time. Even further, the effectiveness of a general area warning is blunted by the necessary time lag between tornado sightings and the time at which the information can be disseminated.

It has been discovered in the past that there is a relation between the frequency of electrical activity resulting from storms and the severity of the storm with tornadoes being associated with very frequent electrical activity. Tornado activity is characterized by virtually continuous electric discharges within and in close proximity to the funnel cloud. Thus, it is possible to ascertain the likelihood of severe storm conditions, including the severest of conditions - a tornado - by monitoring the rate at which electrical discharges are taking place.

The patent to Hunt, U.S. Pat. No. 2,953,020, describes a meteorological warning device in which a rotating antenna continually receives electrical signals resulting from electrical discharges and generates pulses which are counted and the rate of counting used to generate a record which indicates the severity of the storm.

The present invention relates to an apparatus based on the same general principle as the above-mentioned Hunt patent, but which has a number of improvements and innovations which make this invention particularly useful and desirable as a storm warning system. In contrast to the Hunt device, which emphasized long range detection for area weather prediction studies, this invention is designed for short range detection of severe weather conditions. By designing the system to have a restricted range and to give warning only if a severe storm or tornado passes within a pre-selected distance (e.g. ten miles) the usefulness of the apparatus is greatly enhanced for home and individual building use. As mentioned above, the use of individual home warning devices offers a number of substantial advantages over areawide warning systems. First, the user does not need to be awake or watching TV or listening to a radio to be given a warning. Second, the user will be much more inclined to take cover if a warning is given for his own home rather than for a wider area which may encompass several counties or even several states. Third, the user will be given immediate notice when a tornado menaces his house without the deadly delay inherent in area-wide warning systems. Fourth, an individual home warning device offers the user an opportunity to gauge thunderstorm severity below the tornado level and adjust his activities accordingly.

As discussed in detail below, this apparatus includes a number of important innovations. First, a single, preferably non-rotating antenna detects the electrical signals in the air generated by electrical discharges and applies a suitable signal to an amplifier limiter circuit which is preferably comprised of a high gain operational amplifier. This amplifier provides a high gain output signal which is limited in amplitude to a given value to remove dependence of the system upon the amplitude of the electrical discharge signals which is a function of both distance and orginating intensity. The output of the limiter circuit is preferably coupled to an integrating circuit, which preferably also comprises an operational amplifier having a capacitor in one embodiment, and a capacitor and a resistor in another embodiment, coupled in feed-back relation to provide an integrated output signal. A variable resistance element is connected to the input to the operational amplifier of the integrator to vary the severity of the storm activity which is required to cause the output of the integrator to reach a predetermined level. A level detector is connected to the output of the integrator for providing an alarm signal whenever that predetermined level is reached and this alarm signal is in turn applied to an audible alarm which sounds an alarm that a tornado or other storm activity is imminent and that suitable precautions should be taken.

However, as mentioned above, there may be other severe storm conditions which the user may desire to monitor but which may not be of sufficient import to justify an audible alarm, which might wake the user in the middle of the night. According to one embodiment of this invention as set forth below, a meter is connected to the output of the integrator circuit for providing a display indication of the severity of storm activity and a further meter is also preferably connected to the output of the amplifier limiter circuit for providing an indication of storm activity as it is detected.

Storm activity is frequently associated with outages as the discharges strike power lines and create voltage surges which knock out portions of the power grid. Thus, a unit which is dependent only on house current may be rendered ineffective at the time at which it is most required, namely during a storm. If this is late at night, no one at the user's facility may even be aware that the warning device is no longer operative and will be lulled into a false sense of security.

Accordingly, in one embodiment of this invention as described below, the power supply for the system is uninterruptible and includes a pair of batteries which provide standby power such that the system is switched to the batteries should at any time or for any reason the supply of A.C. electrical energy be interrupted.

Further, in order to increase the security of the user and to make sure that the system is operable, a storm simulating device, such as a pulse generator can be provided in the unit together with a manually operated or other switch to connect the simulating electrical discharge pulses to the system to check the operation of the device.

Many other objects and purposes of the invention will become clear from the following detailed description of the drawings.

BRIEF DESCRIPTION OF THE DRAWINGS

FIG. 2 shows a front view of a housing of a further embodiment in which two meters indicate storm activity and intensity, respectively.

FIG. 3 shows a schematic of one circuit of this invention for providing a severe storm warning.

FIG. 4 shows an uninterruptible power supply for supplying the electrical energy for the circuit schematic of FIG. 3.

FIG. 5 shows a further schematic similar to FIG. 3 in which a resistive element is connected in the feed-back loop of the operational amplifier of the integrator circuit.

DETAILED DESCRIPTION OF THE DRAWINGS

Figure 1:
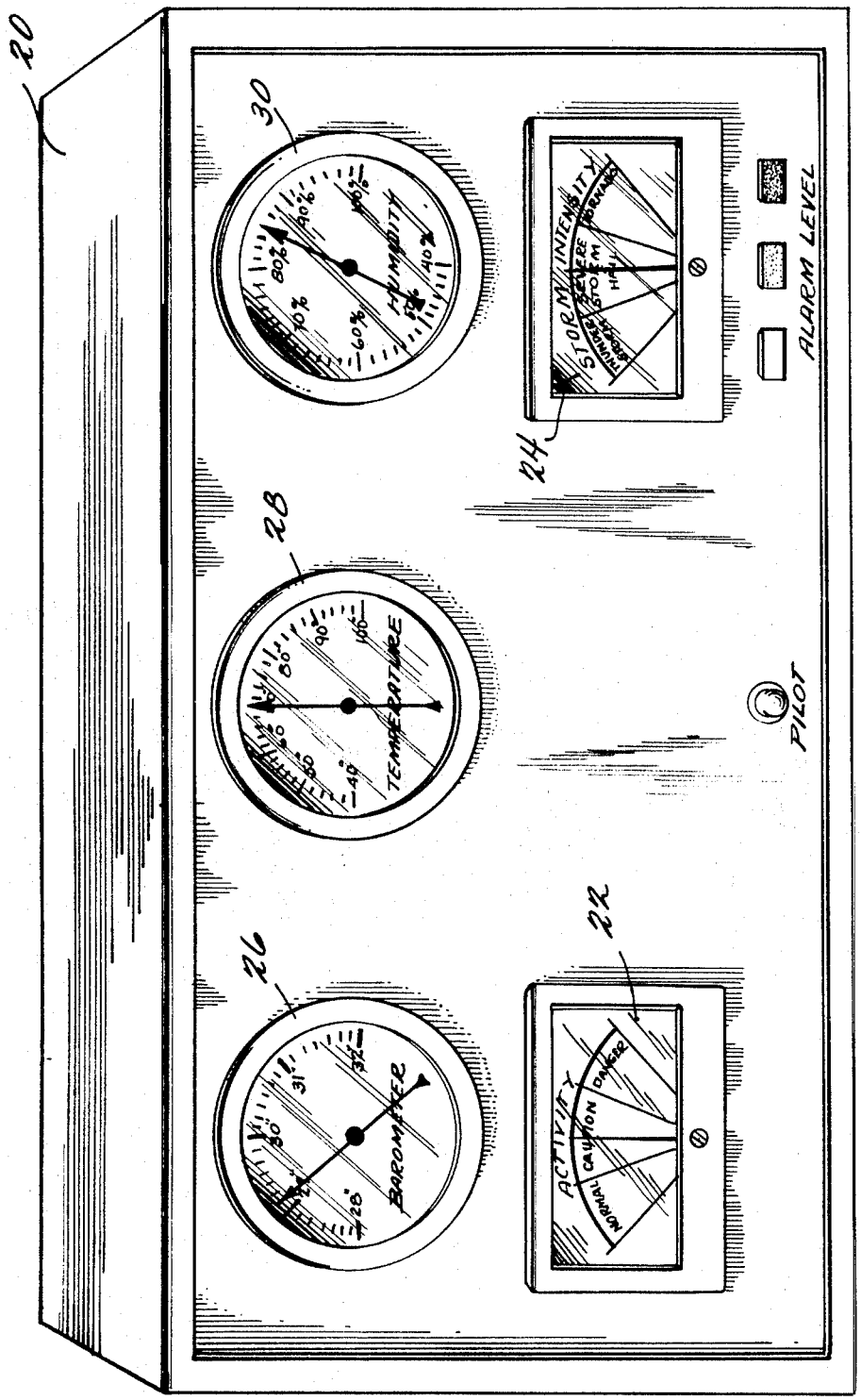
FIG. 1 shows a front view of a housing for one embodiment of the invention whereby storm activity and intensity are displayed on separate meters, as are the barometric pressure, temperature and humidity.

Reference is now made to FIG. 1 which shows a front view of a housing 20 which contains the electrical elements which provide the warning and which is an individual, self-contained unit suitable for use in a home, office or mobile vehicle. A first meter 22 indicates storm activity and a further meter 24 indicates storm intensity. Three meters 26, 28 and 30 denote barometric pressure, temperature and humidity, and this information may be useful to the user in deciding what actions he should take with respect to the information displayed on meters 22 and 24.

FIG. 2 shows a further housing 30 which is simpler and more severe in appearance than the housing 20 of FIG. 1. Only meters 32 and 34, which display storm activity and storm intensity, are visible from the exterior of housing 30.

Reference is now made to FIG. 3 which shows a schematic of one embodiment of the invention. A conventional antenna 40, which is preferably fixed and non-moving, receives electrical emanations resulting from thunderstorm activity and applies these electrical signals as an input to a conventional operational amplifier 42 via resistor 44. A further resistor 46 is connected in feed-back relation between the input and output of operational amplifier 42 so that amplifier 42 operates as a high gain amplifier which limits signals resulting from thunderstorm activity to a given maximum value, thus removing dependence on the amplitude of the signal. Noise signals from remote storms, of course, will not normally be of sufficient amplitude to cause amplifier 42 to produce a limited signal. As mentioned above, it is the frequency of electrical discharge which indicates the severity of storm activity and not the amplitude of discharge signals. A pair of diodes indicated as 50 operate to shunt excess current to ground in the event that a nearby stroke of lightning induces an excessive voltage at the amplifier input terminals.

The output of operational amplifier 42, which is in the form of a noise burst with the peak amplitude limited to a prescribed value. In normal thunderstorms the noise bursts will be associated with individual lightning discharges or strokes. Under tornado conditions the electrical noise radiated will be more nearly a continuous output and closely akin to a man made arc, except in amplitude. The amplified and limited noise signal from amplifier 42 is rectified by diode 52. The rectified signal is averaged by capacitor 58 and resistor 59 so that the display on activity meter 56 is smoothed somewhat and does not jump violently with each stroke of lightning.

The signal averaged by capacitor 58 and resistor 59 is applied to a conventional operational amplifier 60 connected as an integrator. A low-loss capacitor 62, connected in a negative feed-back relation between the output of amplifier 60 and its input, acts in conjunction with amplifier 60 to give an output voltage which is the time integral of the input currents through resistors 59 and 69. The values of resistor 59 and capacitor 62 determines the integration rate for a given input voltage. The current through resistor 69 is set by potentiometer 64 and said current maintains the integrator in the negative limit if the antenna signal level is below the preset value. If the storm radiation reaches the level where the current through resistor 59 exceeds the reference current, then the output voltage of amplifier 60 will be driven positive as a function of the time integral of the sum of input currents. If the storm radiation level is maintained for a sufficient length of time (i.e. 10 sec.) above a prescribed level, then the alarm level will be reached. If the storm radiation level exceeds the alarm level momentarily, the integrator output will start to increase.

The output of amplifier 60 is displayed on a conventional intensity meter 66, as shown in FIGS. 1 and 2, and, as mentioned above, this meter displays for visual inspection the intensity of the storm which has generated the electrical signals received by antenna 40. The output of operational amplifier 60 is also applied to a conventional level detecting circuit 68 which provides an output alarm signal on line 70 whenever the output level of operational amplifier 60 reaches a given level. Thus, in the embodiment of FIG. 3, the integrated train of signals received at the input of operational amplifier 60 via resistor 59 will raise the reference level provided by variable resistor 64. That train will likewise depress the output level of operational amplifier 60 and level detector 68 will provide an output alarm signal whenever that level is depressed to a preset value.

The output alarm signal produced by level detector 60 flows through a conventional relay 72 and operates to activate relay 72 which responds by closing its controlled, normally open switch 74. The closing of switch 74, as shown, completes a current path through an audible alarm such as a horn or the like which then operates to give an alarm to the users which they will hear whether they are asleep or engaged in some other activity.

It should be noted that the operational amplifier 60 in effect sums the power below a given level as established by the limiter circuit in contrast to other arrangements, such as in the Hunt patent mentioned above, where pulses are counted as an indication of storm activity.

Referring to FIG. 4, as indicated above, it is desirable that the system continue working even if conventional A.C. power is no longer available. Accordingly, FIG. 4 illustrates an uninterruptible power supply which has been found to be particularly advantageous in connection with the schematic circuits shown in FIGS. 3 and 5. A 115 volt or other A.C. source is applied to one winding of a conventional transformer 80 with the voltage appearing at the other coil then being rectified by diodes 82 and 84 and applied to terminals 88 and 90. A conventional relay 92 is connected to terminals 88 and 90 and is activated whenever the 115 volt A.C. is coupled to transformer 80 to cause its controlled switches 94 and 96 to shift away from their illustrated position into connection with terminals 88 and 90 to provide the +12 and −12 D.C. voltages for the schematic of FIG. 3.

However, if the 115 volt power supply should be interrupted, then relay 92 becomes deactivated and switches 94 and 96 shift back into their illustrated positions and in these positions conventional standby batteries 100 and 102 are connected to switches 94 and 96 to provide the required +12 and −12 voltages. A pilot light 104 is also provided and can be continually illuminated on the front of the unit to reassure the user that the system is operating properly.

Also, as mentioned briefly above, it may be desirable to provide a built-in test capability so that the user can check from time to time the operation of the unit and be secure in his belief that it will operate when needed. For this purpose, a conventional pulse generator 110, as shown in FIG. 3, can be connected to the input of amplifier 42 via a manually operated switch 112 which can be spring biased into connection with antenna 40 so that the device cannot inadvertently be left in the test position. If desired, the pulse generator 110, besides providing electrical discharge simulating signals which will cause the audible alarm 76 to operate and the intensity meter 66 to indicate a severe storm condition, can also operate an audible simulator 114 which will provide noise similar to thunderstorm activity and provide reassurance to the user that the circuit is responding in the same fashion it will respond to a thunderstorm.

The schematic shown in FIG. 5 operates basically in the same fashion as that shown in FIG. 3 with the electrical signals detected by antenna 120 being applied to operational amplifier 122 which is connected to provide a high gain amplifier limiter with diodes 124 connected in feed-back relation. The output of amplifier limiter 122 is applied directly to an integrator circuit which includes an operational amplifier 126 and a capacitor 128 connected in feed-back relation. However, in contrast with the schematic shown in FIG. 3, in the arrangement of FIG. 5, variable resistor 130 is connected between the output of operational amplifier 126 and ground so that there is a feed-back resistive path between the input of operational amplifier 126 and the output of that same amplifier. This resistive feed-back gives an exponential response which operates to make the unit much less sensitive to storm activity. Activity meters 134 and storm intensity meter 138 are provided for producing the same display functions as the arrangement of FIG. 3. The output of integrator 126 is similarly applied to a level detector 140 and the output of level detector 140 used to activate a relay 142 which in turn closes a switch 144 to cause an audible alarm 146 to operate to give a warning of severe storm activity such as the imminence of a tornado.

The circuits shown in FIG. 3 have been tested and it was found that the alarm rang about 15 minutes prior to a severe hail and wind storm. The circuit also successfully ignored a lightning stroke which struck a tree within 100 yards of the antenna. While a test has not yet taken place with a tornado close enough to establish detection level, it is believed that the device will also successfully detect such a condition.

Many other changes and modifications in the above embodiment of the invention can, of course, be made without departing from the scope of the invention. Accordingly, that scope is intended to be limited only by the scope of the appended claims.

We claim:

1. Apparatus for providing a severe weather warning comprising:
   antenna means for receiving electrical signals resulting from storm activity,
   an amplifier limiter circuit connected to said antenna means for receiving said electrical signals from said antenna means and providing an amplified output signal limited in amplitude to a given valve,
   circuit means connected to said limiter circuit for receiving said amplified output signal and providing an integrated output signal,
   level detector means connected to said circuit means for receiving said integrated output signal and providing an alarm signal when the integrated output signal level reaches a given predetermined level,
   audible alarm means connected to said level detector means for receiving said alarm signal and for providing an audible alarm upon receipt of said audible alarm signal, including a relay connected to said level detector for shifting from a first to second condition when said alarm signal is produced, a switch controlled by said relay for closing when said relay shifts to its second condition and alarm means connected to a source of voltage via said switch for producing an audible alarm when said switch closes.

2. Apparatus as in claim 1 further including means for producing storm simulating electrical signals and means for connecting said simulating signals means to said amplifier circuit.

3. Apparatus as in claim 1 further including a power supply for providing electrical power for said amplifier circuit, said circuit means, said level detector means, and said audible alarm means, said power supply including means for rectifying an A.C. electrical signal to provide a D.C. output signal, means for connecting said rectifying means to an A.C. source, at least a single D.C. battery, output terminals having means for connection to said amplifier circuit, said circuit means, said level detector means and said audible alarm means, means for detecting the presence of an A.C. electrical signal and providing a signal indicating that presence, and switch means responsive to said detecting means for connecting said output terminals to said rectifying means and disconnecting said output terminals from said battery when said detecting means detects and A.C. signal and for connecting said output terminals to said battery and disconnecting said output terminals from said rectifying means when said detecting means does not detect an A.C. signal.

4. Apparatus as in claim 3 including first and second batteries.

5. Apparatus as in claim 3 wherein said detecting means includes a relay connected to said rectifying means and controlling said switch means.

6. Apparatus as in claim 1 wherein said antenna means is immovable.

7. Apparatus for providing a severe weather warning comprising:
   antenna means for receiving electrical signals resulting from storm activity,
   an amplifier limiter circuit connected to said antenna means for receiving said electrical signals from said antenna means and providing an amplified output signal limited in amplitude to a given valve,
   circuit means connected to said limiter circuit for receiving said amplified output signal and providing an integrated output signal,
   level detector means connected to said circuit means for receiving said integrated output signal and providing an alarm signal when the integrated output signal level reaches a given predetermined level,
   audible alarm means connected to said level detector means for receiving said alarm signal and for providing an audible alarm upon receipt of said audible alarm signal, and
   means for varying the storm intensity required to cause said integrated output signal level to reach said predetermined level.

8. Apparatus for providing a severe weather warning comprising:
   antenna means for receiving electrical signals resulting from storm activity,
   an amplifier limiter circuit connected to said antenna means for receiving said electrical signals from said antenna means and providing an amplified output signal limited in amplitude to a given valve,
   circuit means connected to said limiter circuit for receiving said amplified output signal and providing an integrated output signal, including an operational amplifier having an input and an output, a capacitor connected in feed-back between said input and output and a variable resistor connecting the input of said operational amplifier to a D.C. voltage for varying the storm intensity required to cause said integrated output signal level to reach said given predetermined level,
   level detector means connected to said circuit means for receiving said integrated output signal and providing an alarm signal when the integrated output signal level reaches a given predetermined level, and
   audible alarm means connected to said level detector means for receiving said alarm signal and for providing an audible alarm upon receipt of said audible alarm signal.

9. Apparatus for providing a severe weather warning comprising:
   antenna means for receiving electrical signals resulting from storm activity,
   an amplifier limiter circuit connected to said antenna means for receiving said electrical signals from said antenna means and providing an amplified output signal limited in amplitude to a given valve,
   circuit means connected to said limiter circuit for receiving said amplified output signal and providing an integrated output signal, including an operational amplifier, a capacitor connected in feedback between said input and output for varying the storm intensity required to cause said integrated output signal level to reach said given predetermined level,
   level detector means connected to said circuit means for receiving said integrated output signal and providing an alarm signal when the integrated output signal level reaches a given predetermined level, and
   audible alarm means connected to said level detector means for receiving said alarm signal and for providing an audible alarm upon receipt of said audible alarm signal.

10. Apparatus for providing a severe weather warning comprising:
    antenna means for receiving electrical signals resulting from storm activity,
    an amplifier limiter circuit connected to said antenna means for receiving said electrical signals from said antenna means and providing an amplified output signal limited in amplitude to a given valve,
    circuit means connected to said limiter circuit for receiving said amplified output signal and providing an integrated output signal,
    level detector means connected to said circuit means for receiving said integrated output signal and providing an alarm signal when the integrated output signal level reaches a given predetermined level,
    audible alarm means connected to said level detector means for receiving said alarm signal and for providing an audible alarm upon receipt of said audible alarm signal,
    first meter means connected to said amplifier limiter circuit for receiving said amplified output signal and displaying storm activity,
    second meter means connected to said circuit means for receiving said integrated output signal and displaying storm activity, and
    a housing for holding said limiter circuit, said circuit means, said level detector means, said first and second meter means and said audible alarm means with said first and second meter means being visible from the exterior of said housing.

11. Apparatus as in claim 10 further including means mounted in said housing and visible from the exter-ior thereof for detecting and displaying humidity, temperature and barometric pressure.

12. Apparatus for providing a severe weather warning comprising:
    antenna means for receiving electrical signals resulting from storm activity,
    an amplifier limiter circuit connected to said antenna means for receiving said electrical signals from said antenna means and providing an amplified output signal limited in amplitude to a given valve including a high gain operational amplifier,
    circuit means connected to said limiter circuit for receiving said amplified output signal and providing an integrated output signal, and
    level detector means connected to said circuit means for receiving said integrated output signal and providing an alarm signal when the integrated output signal level reaches a given predetermined level.

13. Apparatus for providing a severe weather warning comprising:
    antenna means for receiving electrical signals resulting from storm activity,
    an amplifier limiter circuit connected to said antenna means for receiving said electrical signals from said antenna means and providing an amplified output signal limited in amplitude to a given valve, circuit means connected to said limiter circuit for receiving said amplified output signal and providing an integrated output signal, level detector means connected to said circuit means for receiving said integrated output signal and providing an alarm signal when the integrated output signal level reaches a given predetermined level, audible alarm means connected to said level detector means for receiving said alarm signal and for providing an audible alarm upon receipt of said audible alarm signal, and means connecting said amplifier limiter circuit to said circuit means for rectifying said amplified output signal.

14. Apparatus for providing a severe weather warning comprising:

antenna means for receiving electrical signals resulting from strom activity, circuit means for receiving said electrical signal and providing an integrated output signal, means connected to said circuit means for receiving said integrated output signal and providing an alarm signal when the integrated output signal level reaches a given predetermined level, and a power supply for providing electrical power for said circuit means, and said alarm means, said power supply including means for rectifying an A.C. electrical signal to provide a D.C. output signal, means for connecting said rectifying means to an A.C. source, at least a single D.C. battery, output terminals, having means for connection to said amplifier circuit, said circuit means, said level detector means and said audible alarm means, means for detecting the presence of an A.C. electrical signal, and switch means responsive to said detecting means for connecting said output terminals to said rectifying means and disconnecting said output terminals from said battery when said detecting means detects an A.C. signal and for connecting said output terminals to said battery and disconnecting said output terminals, including a relay connected to said level detector for shifting from a first to second condition when said alarm signal is produced, a switch controlled by said relay for closing when said relay shifts to its second condition and alarm means connected to a source of voltage via said switch for producing an audible alarm when said switch closes.

15. Apparatus for providing a severe weather warning comprising:

antenna means for receiving electrical signals resulting from storm activity, an amplifier limiter circuit connected to said antenna means for receiving said electrical signals from said antenna means and providing an amplified output signal limited in amplitude to a given value, circuit means connected to said limiter circuit for receiving said amplified output signal and providing an integrated output signal, level detector means connected to said circuit means for receiving said integrated output signal and providing an alarm signal when the integrated output signal level reaches a given predetermined level, first meter means connected to said amplifier limit circuit for receiving said amplified output signal and displaying storm activity, second meter means connected to said circuit means for receiving said integrated output signal and displaying storm intensity, audible alarm means connected to said level detector means for receiving said alarm signal and for providing an audible alarm upon receipt of said audible alarm signal, including a relay connected to said level detector for shifting from a first to second condition when said alarm signal is produced, a switch controlled by said relay for closing when said relay shifts to its second condition and alarm means connected to a source of voltage via said switch for producing an audible alarm when said switch closes.

* * * * *